United States Patent [19]

Ohara et al.

[11] Patent Number: 4,481,330
[45] Date of Patent: Nov. 6, 1984

[54] POLYCARBONATE RESIN COMPOSITION

[75] Inventors: Osamu Ohara; Kazuo Kishimoto, both of Matsuyama, Japan

[73] Assignee: Teijin Chemicals, Ltd., Tokyo, Japan

[21] Appl. No.: 447,671

[22] Filed: Dec. 7, 1982

[30] Foreign Application Priority Data

Dec. 8, 1981 [JP] Japan .............................. 56-196256
Dec. 8, 1981 [JP] Japan .............................. 56-196257
May 18, 1982 [JP] Japan .............................. 57-82404

[51] Int. Cl.$^3$ .............................................. C08L 69/00
[52] U.S. Cl. ........................................ 525/67; 525/68
[58] Field of Search ................................... 525/67, 68

[56] References Cited

U.S. PATENT DOCUMENTS

| | | | |
|---|---|---|---|
| 3,218,372 | 11/1965 | Okamura et al. | 525/439 |
| 3,842,144 | 10/1974 | Tanaka et al. | 525/476 |
| 3,864,428 | 2/1975 | Nakamura et al. | 525/67 |
| 3,886,232 | 5/1975 | Tanaka et al. | 525/82 |
| 3,886,235 | 5/1975 | Tanaka et al. | 525/303 |
| 4,257,937 | 3/1981 | Cohen et al. | 524/445 |
| 4,264,487 | 4/1981 | Fromuth et al. | 525/67 |
| 4,384,076 | 5/1983 | Ohara et al. | 525/67 |

*Primary Examiner*—Jacob Ziegler
*Attorney, Agent, or Firm*—Sherman & Shalloway

[57] ABSTRACT

A polycarbonate resin composition comprising
(A) 20 to 90% by weight of a polycarbonate resin,
(B) 5 to 70% by weight of an aromatic polyester resin,
(C) 1 to 15% by weight of an isobutylene copolymer rubber composed of a major proportion of isobutylene and a minor proportion of isoprene,
(D) 1 to 20% by weight of an elastomeric acrylic graft copolymer resin composed of, as a trunk polymer, a crosslinked acrylic copolymer containing not less than 3% by weight of butadiene as a comonomer and being free from ethylene and grafted thereto, at least one grafting monomer selected from the group consisting of styrene, alkyl acrylates and alkyl methacrylates, and
(E) 0 to 15% by weight of an olefin resin derived from an olefin having 2 to 6 carbon atoms; wherein the weight ratio of [resin (A)+resin (B)]/[rubber (C)+resin (D)] is from 2 to 20, and if the resin (E) is present, the weight ratio of resin (B)/[rubber (C)+resin (D)+resin (E)] is from 1 to 5.

12 Claims, No Drawings

POLYCARBONATE RESIN COMPOSITION

This invention relates to a polycarbonate resin composition having improved properties which comprises a polycarbonate resin, an aromatic polyester resin and a modifier resin. Particularly, it relates to a polycarbonate resin composition having improved properties, such as excellent resistance to solvents, particularly to gasoline, especially high-octane gasoline, excellent impact strength (especially at low temperatures), resistance to the deterioration of impact strength by heat aging, improved melt flow property, and excellent mold releasability during molding, in a well-balanced combination.

More particularly, this invention pertains to a polycarbonate resin composition comprising (A) 20 to 90% by weight of a polycarbonate resin, (B) 5 to 70% by weight of an aromatic polyester resin, (C) 1 to 15% by weight of an isobutylene copolymer rubber composed of a major proportion of isobutylene and a minor proportion of isoprene, (D) 1 to 20% by weight of an elastomeric acrylic graft copolymer resin composed of, as a trunk polymer, a crosslinked acrylic copolymer containing not less than 3% by weight of butadiene as a comonomer and being free from ethylene and grafted thereto, at least one grafting monomer selected from the group consisting of styrene, alkyl acrylates and alkyl methacrylates, and (E) 0 to 15% by weight of an olefin resin derived from an olefin having 2 to 6 carbon atoms, wherein the weight ratio of [resin (A)+resin (B)]/[rubber (C)+resin (D)] is from 2 to 20, and if the resin (E) is present, the weight ratio of resin (B)/[rubber (C)+resin (D)+resin (E)] is from 1 to 5.

Exterior automotive parts such as bumpers, panels and fenders have previously been made of steel, but with the recent need for reducing the fuel cost and the weight of automobiles, there has been a strong demand for the utilization of plastics as a substitute for steel. The advantages of plastics, such as high corrosion resistance and resistance to denting, over steel have been evaluated, and a particular interest has been aroused in polycarbonate resins having excellent impact strength and heat resistance.

For use as motor vehicle component parts, molded articles of polycarbonate resins present the following four problems.

(1) The impact strength of a molded article of a polycarbonate resin depends greatly upon its thickness. For example, the Izod impact strength value (notched) of a 3.2 mm (⅛ inch) thick article shows ductile fracture, whereas a 6.4 mm (¼ inch) thick article shows brittle fracture. This indicates that the impact strength is reduced greatly with an article having a large thickness.

(2) The high Izod strength (notched) at a thickness of 3.2 mm decreases rapidly at low temperatures.

(3) When the polycarbonate article is exposed to a high temperature condition, it undergoes heat aging and greatly decreases in impact strength.

(4) Because of its low solvent resistance, a large-sized article or a molded article of a complex shape having a high residual stress develops stress cracking upon contact with paints or gasoline.

In particular, the solvent resistance mentioned in (4) above and the heat aging resistance of impact strength mentioned in (3) above should be improved greatly.

Various polycarbonate resin compositions, especially those composed of a polycarbonate resin and an aromatic polyester resin, optionally with a modifier resin, have been suggested in the past in an attempt to improve the impact strength of the polycarbonate without substantially sacrificing its desirable properties. It has been extremely difficult however to provide a polycarbonate resin composition which has satisfactory improved properties in a well-balanced combination.

For example, U.S. Pat. No. 3,218,372 discloses a resin composition substantially comprising 95 to 5% by weight of a polycarbonate and 5 to 95% by weight of a poly(alkylene terephthalate), and states that this resin composition lends itself to easier molding operation because of its lower melt viscosity than in the case of using the polycarbonate singly, and that as the ductility of the resin composition is higher than in the case of using the polyalkylene terephthalate singly, it gives a molded article having excellent physical, chemical and electrical properties. This patent, however, fails to say anything about the combined use of the components (C), (D) and (E) in the composition of the present application. The resin composition suggested in this patent has unsatisfactory impact strength especially at low temperatures, and does not have good resistance to solvents and good impact strength in a well-balanced combination. Furthermore, the resin composition disclosed in this document has unsatisfactory resistance to the deterioration of impact strength by heat aging.

U.S. Pat. No. 4,264,487 discloses a high impact resistant and long-term heat resistant composition comprising (a) about 25-95% of an aromatic polyester, (b) about 1-50% of an aromatic polycarbonate, and (c) the balance to make 100% of a core-shell polymer comprising about 25-95 weight-% of a first elastomeric phase polymerized from a monomer system comprising about 75-99.8% by weight of a ($C_1$-$C_6$) alkyl acrylate, 0.1-5% crosslinking monomer, and 0.1-5% graftlinking monomer, and about 75 to 5 percent of a final, rigid thermoplastic phase. This patent neither discloses the combined use of the components (C), (D) and (E) used in the composition of the present invention. In the composition suggested in this patent, improved properties over a composition consisting essentially of the polycarbonate resin and the aromatic polyester resin are obtained by the incorporation of the core-shell polymer. The resulting composition, however, has still unsatisfactory solvent resistance and low-temperature impact strength.

U.S. Pat. No. 3,864,428 discloses a thermoplastic resin composition which comprises A: 25 to 85 percent by weight of an aromatic polyester, B: 10 to 75 percent by weight of an aromatic polycarbonate, and C: 2 to 35 percent by weight of a graft copolymer of a butadiene polymer-vinyl monomer, the proportion of the butadiene polymer component in the graft copolymer being 1 to 30 percent by weight based on the total weight of the components (A), (B) and (C). This patent neither discloses the combined use of the components (C), (D) and (E) in the composition of the present invention. Furthermore, this resin composition is desired to be further improved in regard to solvent resistance and low-temperature impact strength.

U.S. Pat. No. 4,257,937 discloses modified thermoplastic polyester compositions which comprise (a) a poly(1,4-butylene terephthalate) resin or polyester copolymer and, optionally, a poly(ethylene terephthalate)

resin and (b) a modifier therefor comprising a combination of a polyacrylate resin and an aromatic polycarbonate, and, optionally (c) filler and/or reinforcing agent and/or (d) a flame retardant. Modifier (b) provides enhanced resistance to impact fracture, increased strength and improved resistance to heat distortion in articles molded from the compositions. This patent neither discloses the combined use of the components (C), (D) and (E) in the composition of this invention, and the composition is not entirely satisfactory in regard to solvent resistance and low-temperature impact strength.

The present inventors made extensive investigations in order to remove the defects of the aforesaid conventional polycarbonate resin compositions composed of a polycarbonate resin, an aromatic polyester resin and a modifier resin, and to provide a new and useful polycarbonate resin composition capable of giving molded articles having excellent resistance to solvents, particularly high-octane gasoline, and high impact strength even in a cold atmosphere.

Consequently, it was found important to improve mold releasability (poor releasability causes strains in the molded articles in releasing them), to reduce a residual stress in the molded articles and to prevent the penetration of gasoline through the molded articles. Further investigations based on this discovery were undertaken in order to develop a polycarbonate resin composition comprising major proportions of polycarbonate and aromatic polyester, which meets the above requirement and has the improved properties in a well-balanced combination. These investigations have now led to the discovery that a polycarbonate resin composition comprising the four or five components (A), (B), (C) and (D), optionally component (E) in the proportions specified hereinabove as main components has excellent resistance to solvents, particularly to high-octane gasoline, excellent impact strength particularly at low temperatures, excellent resistance to the deterioration of impact strength by heat aging, improved melt flow property, and excellent mold releasability during molding in a well-balanced combination.

The polycarbonate resin composition of this invention has much higher resistance to solvents such as high-octane gasoline and resistance to the deterioration of impact strength by heat aging than the polycarbonate resin alone, and the impact strength, especially at low temperatures, of a molded article of this composition having a large wall thickness is improved. Furthermore, the composition of this invention has excellent moldability, and gives molded articles having excellent mechanical properties such as tensile strength, excellent surface appearance and excellent resistance to discoloration by heat. Accordingly, the molded articles of the composition of this invention can be used as exterior automotive parts such as bumpers, panels and fenders.

It is an object of this invention therefore to provide a four-component or a five-component polycarbonate resin composition having excellent improved properties.

The above and other objects and advantages of this invention will become more apparent from the following description.

The polycarbonate resin composition of this invention is composed of the following four or five components of which the polycarbonate resin and the aromatic polyester resin are major components.

(A) 20 to 90% by weight, preferably 40 to 80% by weight, of a polycarbonate resin.

(B) 5 to 70% by weight, preferably 10 to 45% by weight, of an aromatic polyester resin.

(C) 1 to 15% by weight, preferably 2 to 12% by weight, of an isobutylene copolymer rubber composed of a major proportion of isobutylene and a minor proportion of isoprene.

(D) 1 to 20% by weight, preferably 3 to 15% by weight, of an elastomeric acrylic graft copolymer resin composed of a crosslinked acrylic copolymer containing not less than 3% by weight of butadiene as a comonomer and being free from ethylene, as a trunk polymer, and grafted thereto, at least one grafting monomer selected from the group consisting of styrene, alkyl acrylates and alkyl methacrylates.

(E) 0 to 15% by weight, preferably 0 to 10% by weight, of an olefin resin derived from an olefin having 2 to 6 carbon atoms.

In the above composition, the weight ratio of [resin (A)+resin (B)]/[rubber (C)+resin (D)] is from 2 to 20, and when there is resin (E), the weight ratio of resin (B)/[rubber (C)+resin (D)+resin (E)] is from 1 to 5. When the resin (E) is used, its preferred amount is 1 to 10% by weight, more preferably 2 to 5% by weight.

The excellent improved properties of the polycarbonate resin composition of this invention are achieved presumably by the interaction of the above four or five specified components in the specified proportions, but no detail of this mechanism has been elucidated. The above presumption has been derived from the fact that as shown in comparative runs given hereinbelow, the excellent improved properties cannot be achieved by compositions which lack any one of the three components (B) to (D).

The polycarbonate resin composition of this invention has superior mold releasability, and improved melt flow property. Accordingly, it can be molded into large-sized or complexly-shaped articles having a low residual stress. Since these molded articles maintain a high impact strength even in a cold atmosphere and have greatly improved solvent resistance, they do not undergo stress cracking upon contact with high-octane gasoline and can fully withstand impact in a cold climate. Accordingly, the polycarbonate resin composition of this invention can be widely used in applications which require resistance to gasoline, etc., for example as automotive parts. It can be especially advantageously used as an automobile bumper which requires impact strength in a cold climate.

The polycarbonate resin (A) used in this invention can be produced by a method known per se, for example by reacting a dihydric phenol with a carbonate precursor such as phosgene in the presence of an acid acceptor and a molecular weight controlling agent, or by ester interchange reaction between a dihydric phenol and a carbonate-precursor such as diphenyl carbonate.

Preferred dihydric phenols are bisphenols, and bisphenol A [i.e., 2,2-bis(4-hydroxyphenyl)propane] is especially preferred. Bisphenol A may be partly or wholly replaced by another dihydric phenol. Examples of dihydric phenols other than bisphenol A include hydroquinone, 4,4'-dihydroxydiphenyl, bis(4-hydroxyphenyl)methane, 1,1-bis(4-hydroxyphenyl)cyclohexane, 2,2-bis(3,5-dimethyl-4-hydroxyphenyl)propane, bis(4-hydroxyphenyl)sulfide, bis(4-hydroxyphenyl)sulfone, bis(4-hydroxyphenyl)sulfoxide, bis(4-hydroxyphenyl)ketone, bis(4-hydroxyphenyl)ether, and halogenated bisphenols such as 2,2-bis(3,5-dibromo-4-hydroxyphenyl)propane.

The polycarbonate resin may also be a homopolymer of such a dihydric phenol, a copolymer of two or more of such dihydric phenols, or a mixture of such polymers and/or such copolymers.

These polycarbonate resins may be easily obtained commercially.

Examples of preferred polycarbonate resins as component (A) are polycarbonates of bisphenol A, copolycarbonates of bisphenol A and not more than 20 mole%, based on the entire dihydric alcohol component, of bis(4-hydroxyphenyl)methane, 1,1-bis(4-hydroxyphenyl)cyclohexane, bis(4-hydroxyphenyl)sulfone, 2,2-bis(3,5-dimethyl-4-hydroxyphenyl)propane, or 2,2-bis(3,5-dibromo-4-hydroxyphenyl)propane, and mixtures of bisphenol A polycarbonates with not more than 20% by weight, based on the entire mixture, of a homopolycarbonate of bis-(4-hydroxyphenyl)methane, 1,1-bis(4-hydroxyphenyl)cyclohexane, bis(4-hydroxyphenyl)sulfone, 2,2-bis(3,5-dimethyl-4-hydroxyphenyl)propane or 2,2-bis(3,5-dibromo-4-hydroxyphenyl)propane. The bisphenol A polycarbonates are especially preferred.

The aromatic polyester resin (B) used in this invention can be produced by a known method, or obtained from the market. A preferred aromatic polyester resin (B) is a polyester derived from an alkylene glycol with 2 to 10 carbon atoms and an aromatic dicarboxylic acid with 8 to 12 carbon atoms or an ester-forming derivative thereof such as a lower alkyl ester of the aromatic dicarboxylic acid. Examples of the alkylene glycol are ethylene glycol, 1,4-butanediol, 1,6-hexanediol, 1,4-cyclohexane dimethanol and 1,10-decamethylene glycol, and examples of the aromatic dicarboxylic acid are terephthalic acid, isophthalic acid and 2,6-naphthalenedicarboxylic acid. Thus, illustrative of such an aromatic polyester resin (B) are poly(ethylene terephthalate), poly(1,4-butylene terephthalate), amorphous poly(ethylene terephthalate) copolyesters, amorphous poly(1,4-butylene terephthalate) copolyesters, and amorphous poly(1,4-cyclohexane dimethylene terephthalate) copolyesters.

A copolymer usually called "butyl rubber" can be used as the isobutylene copolymer rubber (C) in the composition of this invention. It is, for example, a copolymer rubber composed of 93 to 99% by weight of isobutylene and 7 to 1% by weight of isoprene. Such a copolymer rubber and a method for its production are known, and the copolymer rubber is commercially available. The isobutylene copolymer rubber (C) can be produced, for example, by copolymerizing 93 to 99% by weight of isobutylene and 7 to 1% by weight of isoprene in the presence of a Friedel-Crafts type metal halide catalyst such as aluminum chloride at a low temperature, for example at about $-100°$ C. Preferably, the copolymer rubber (C) has a relatively high melt viscosity. Examples of the commercially available copolymer rubber (C) are IIR-065 and IIR-268 (trademark for products of Nippon Butyl Co., Ltd.) and Exxon Butyl-065 (a trademark for a product of Exxon Chemical Co.).

The elastomeric acrylic graft copolymer used as component (D) in this invention is composed of a crosslinked acrylic copolymer containing not less than 3% by weight, preferably 3 to 40% by weight, more preferably 5 to 30% by weight, of butadiene as a comonomer and being free from ethylene, as a trunk polymer, and grafted thereto, at least one grafting monomer selected from the group consisting of styrene, alkyl acrylates and alkyl meth-acrylates.

Examples of acrylic components which form the crosslinked acrylic copolymer include alkyl acrylates, preferably those having 2 to 12 carbon atoms in the alkyl group, and alkyl methacrylates, preferably those having 1 to 4 carbon atoms in the alkyl group. Specific examples of the alkyl acrylates are 2-ethylhexyl acrylate, n-butyl acrylate, 2-methylbutyl acrylate, ethyl acrylate, n-hexyl acrylate and n-dodecyl acrylate. Specific examples of the alkyl methacrylates are methyl methacrylate, ethyl methacrylate and n-butyl methacrylate. Crosslinking agents which may be used in crosslinking the acrylic copolymer include, for example, ethylene glycol dimethacrylate, diethylene glycol diacrylate, divinylbenzene and divinyltoluene.

Examples of the alkyl acrylates and methacrylates as the grafting monomer to be grafted to the trunk polymer may be the same as those given above with regard to the trunk polymer. The grafting monomer may include a small amount of acrylonitrile.

The elastomeric acrylic graft copolymer and a method for its production are known. It can be produced, for example, by emulsion-polymerizing 35 to 60 parts by weight of an alkyl acrylate, 5 to 20 parts by weight of butadiene and 0 to 10 parts by weight of an alkyl methacrylate in the presence of 0.6 to 1.3 parts by weight of a crosslinking agent, adding a flocculating agent to the resulting latex to adjust its average particle diameter preferably to about 0.13–0.20 micron, and grafting the grafting monomer to the resulting latex-like rubber (trunk polymer). The grafting can be effected, for example, by graft-polymerizing 20 to 25 parts by weight of a monomeric mixture composed of 5 to 15 parts by weight of styrene, 5 to 15 parts by weight of methyl methacrylate, 0 to 10 parts by weight of acrylonitrile and 0.1 to 0.3 part by weight of a crosslinking agent as a first grafting component with 65 parts by weight of the latex-like rubber (trunk polymer), and further graft-polymerizing 10 to 15 parts of a monomer mixture consisting of 10 to 15 parts by weight of methyl methacrylate and 0.1 to 0.3 part by weight of a crosslinking agent as a second grafting component.

The aforesaid elastomeric acrylic graft copolymer (D) and the method for its production are described in detail, for example in U.S. Pat. Nos. 3,842,144, 3,886,232, and 3,886,235 which disclose such a graft copolymer as a modifying component. Such graft copolymers are commercially available, and for example, a resin sold under the trademark HIA-15 can be obtained from Kureha Chemical Industry Co., Ltd.

The polycarbonate resin composition of this invention may further include the olefin resin (E) derived from an olefin having 2 to 6 carbon atoms. Examples of such olefin resin are homopolymers of $C_2$–$C_6$ olefins or copolymers of these with each other or with another monomer copolymerizable with the olefins, such as vinyl acetate, vinyl chloride and tetrafluoroethylene. Examples of preferred olefin resins are polyethylene, polypropylene and poly(4-methylpentene-1). Processes for the production of these olefin resins are well known, and the olefin resins may be obtained from the market.

The polymethylpentene resin (E) used in the composition of this invention may, for example, be polymers based on 4-methylpentene-1, preferably those having a density of about 0.83 to about 0.84. Such a resin is commercially available, for example from Mitsui Petrochemical Industries, Ltd. under the tradename "TPX".

Examples of the polyethylene resin (E) are low-density polyethylene, medium-density polyethylene, high-density polyethylene, and suitable mixtures of these. These polyethylene resins are also commercially available. Polyethylene resins having a density of about 0.94 to about 0.96 or blends of these are preferred.

Suitable polypropylene resins (E) have a density of about 0.89 to about 0.91, and blends of these are also preferred. These polypropylene resins are also commercially available.

Furthermore, ethylene/propylene copolymer, ethylene/butene-1 copolymer, propylene/butene-1 copolymer, and ethylene/4-methylpentene-1 copolymer may be cited as examples of the olefin copolymers. Examples of the copolymer of such as olefin with the other copolymerizable monomer are ethylene/vinyl acetate copolymer, ethylene/vinyl chloride copolymer and ethylene/tetrafluoroethylene copolymer.

In the polycarbonate resin composition of this invention composed of major proportions of the polycarbonate resin (A) and the aromatic polyester (B) and minor proportions of the isobutylene copolymer rubber (C) and the elastomeric acrylic graft copolymer resin (D) and optionally the olefin resin (E) derived from a $C_2$-$C_6$ olefin, the proportions of the individual components are as follows:

(A) Polycarbonate resin: 20 to 90% by weight, preferably 40 to 80% by weight.
(B) Aromatic polyester resin: 5 to 70% by weight, preferably 10 to 45% by weight.
(C) Isobutylene copolymer rubber: 1 to 15% by weight, preferably 2 to 12% by weight.
(D) Elastomeric acrylic graft copolymer resin: 1 to 20% by weight, preferably 3 to 15% by weight.
(E) Olefin resin: 0 to 15% by weight, preferably 0 to 10% by weight.

It is also required that within the aforesaid ranges of proportions, the weight ratio of [resin (A)+resin (B)]/[rubber (C)+resin (D)] be from 2 to 20, and if the resin (E) is present, the weight ratio of resin (B)/[rubber (C)+resin (D)+resin (E)] be from 1 to 5.

If the proportion of the polycarbonate resin (A) is too small below the aforesaid lower limit, the excellent impact strength, especially the excellent impact strength at low temperatures, and the excellent resistance to the deterioration of impact strength by heat aging, as contemplated by this invention cannot be obtained. If it is too large above the upper limit, the intended excellent solvent resistance in accordance with this invention cannot be obtained.

If the proportion of the aromatic polyester resin (B) is too small below the above-specified lower limit, the high rigidity and solvent resistance intended by this invention cannot be obtained. If it is too large above the upper limit, the excellent impact strength at low temperatures and the excellent resistance to the deterioration of impact strength by heat aging intended by this invention cannot be obtained.

If the proportion of the isobutylene copolymer rubber (C) is too small below the above-specified lower limit, the excellent solvent resistance and the excellent impact strength (with a 6.35 mm thick sample) intended by this invention cannot be obtained. If, on the other hand, it is too large above the above-specified upper limit, the characteristic rigidity of the polycarbonate resin is drastically reduced, and delamination occurs in a molded article from the resin composition of this invention to degrade its appearance.

Furthermore, if the proportion of the elastomeric acrylic graft copolymer (D) is too small below the above-specified lower limit, the excellent impact strength (especially at low temperatures) and the excellent resistance to the deterioration of impact strength by heat aging intended by this invention cannot be achieved. If it is too large above the upper limit, the melt flow rate of the resin composition decreases, and various mechanical properties, such as rigidity, tensile strength and flexural strength, of a molded article prepared from the resulting resin composition are degraded.

The olefin resin (E) as an optional component serves to maintain the aforesaid excellent properties in balance.

If the weight ratio of [resin (A)+resin (B)]/[rubber (C)+resin (D)] is too low below the abovespecified lower limit, the melt flow rate of the resin composition decreases, and the mechanical properties such as rigidity and flexural strength of a molded article prepared from the resin composition are degraded. If it is too high above the upper limit, the excellent impact strength at low temperatures and the excellent resistance to the deterioration of impact strength by heat aging intended by this invention cannot be obtained.

Furthermore, if the weight ratio of resin (B)/[rubber (C)+resin (D)+resin (E)] is too low below the lower limit specified above, the melt flow rate of the resin composition decreases and the rigidity of a molded article prepared from it is reduced. If it it too high above the upper limit, the excellent impact strength at low temperatures and the excellent resistance to the deterioration of impact strength by heat aging cannot be obtained.

In a preferred embodiment of the invention, there can be provided a polycarbonate resin composition having excellent solvent resistance, especially high-octane gasoline resistance, excellent low-temperature impact strength, excellent resistance to the deterioration of impact strength by heat aging, improved melt flow property, and excellent mold releasability in a well-balanced combination, which, according to the testing methods described below, has a melt flow rate of about 10 to 15 g/10 minutes, a flexural modulus of about $18 \times 10^3$ to $22 \times 10^3$ kgf/cm$^2$, a relative flexural strength in high-octane gasoline of about 65 to 80, a relative flexural strength in carbon tetrachloride of about 70 to 90, no cracking in a bolt clamping test in high-octane gasoline, carbon tetrachloride, or methyl isobutyl ketone, a releasability of not more than about 100 kg, and in many cases not more than 90 kg, in a mold releasability test, an Izod impact strength of at least about 23 kgf.cm/cm (3.18 mm thick) in an impact resistance test at −10° C., and a heat aging resistance (after heat-treatment) of at least about 45 kgf.cm/cm in an impact heat aging test (125° C.×65 hours; 3.18 mm thick). A 6.35 mm thick specimen has an Izod impact strength at −10° C. of at least 20 kgf.cm/cm, and after heat-treatment at 125° C. for 65 hours, shows an Izod impact strength of more than 20 kgf.cm/cm.

The polycarbonate resin composition of this invention can be prepared by mixing the polycarbonate resin (A), the aromatic polyester resin (B), the isobutylene copolymer rubber (C), the elastomeric acrylic graft copolymer resin (D) and optionally the olefin resin (E) by using any known kneading means by which these components can be mixed uniformly. For example, the four or five components (A), (B), (C) and (D) and optionally (E) may be mixed by a mixer such as a V-type blender or a super mixer and then melt-mixed in an extruder; or they are melt-mixed by a mixer such as a Co-Kneader. Or components (C), (D) and (E), components (C) and (D) and components (C) and (E) may be respectively mixed by a mixer such as a kneading roll or a Bunbury mixer, and the resulting mixture may be mixed in the molten state with the remaining components. Among these methods, those which involve two or more melt-mixing operations are preferred because they increase the degree of mixing.

The melt-mixing can be effected at a temperature at which a component having the highest melting point can be melted. For example, the temperature is about 230° to about 300° C.

In addition to the components (A), (B), (C) and (D), and optionaly (E), the polycarbonate resin composition of this invention may include various additives ordinarily incorporated in resin compositions of this type.

Such additives are, for example, about 0.5 to about 20 parts by weight of a filler or a reinforcing agent; about 0.01 to about 0.1 part by weight of a heat stabilizer; about 0.01 to about 0.2 part by weight of an antioxidant; about 0.1 to about 0.7 part by weight of a light stabilizer; about 0.1 to about 10 parts by weight of a fire retardant; about 0.5 to about 3 parts by weight of a plasticizer; about 0.1 to about 3 parts by weight of an antistatic agent; about 0.1 to about 1 part by weight of a mold releasing agent; about 0.3 to about 1 part by weight of a blowing agent; and about 1 to about 10 parts by weight of another resin or rubber miscible with these components. The above amounts of the additives are based on 100 parts by weight of the polycarbonate resin.

Examples of the filler or reinforcing agent include glass fibers, asbestos, carbon fibers, silica, talc and calcium carbonate.

Examples of the heat stabilizer include triphenyl phosphite, tris-(2,6-dimethylphenyl)phosphite, tris-(mixed mono- and di-nonylphenyl) phosphite, dimethylbenzene phosphonate and trimethyl phosphate.

Examples of the antioxidant include octadecyl-3-(3,5-di-tert-butyl-4-hydroxyphenyl)propionate, and pentaerythrityl-tetrakis[3-(3,5-di-tert-butyl-4-hydroxyphenyl) propionate].

Examples of the light stabilizer include 2-(2-hydroxy-5-methylphenyl)benzotriazole, 2-(2-hydroxy-5-tert-octylphenyl)-benzotriazole and 2-hydroxy-4-n-octoxy benzophenone.

Examples of the fire retardant include 2,2-bis(3,5-dibromo-4-hydroxyphenyl)propane, hexabromocyclododecane, sodium 3,5-dibromobenzenesulfonate and sodium lauryl sulfate.

Examples of the plasticizer include dioctyl-4,5-epoxy-hexahydrophthalate, tris-(octoxycarbonylethyl)isocyanurate tristearin and epoxidized soybean oil.

Examples of the antistatic agent include glycerol monostearate, sodium stearyl sulfonate, and sodium dodecylbenzenesulfonate.

Examples of the mold releasing agent include stearyl stearate, beeswax, montan wax and paraffin wax.

Examples of the other resin are polystyrene, polymethyl methacrylate, AS resin, ABS resin, MBS resin, and polyphenylene oxide.

Such additives may be mixed at a suitable time during the mixing of the components for forming the composition.

The following examples illustrate the present invention more specifically. All parts in these examples are by weight. The various properties shown in these examples were measured by the following methods.

[I] Molding flowability

Dried pellets of the composition were used as a specimen, and the melt flow rate of the specimen was measured by the method described in ASTM D1238 except that the testing temperature was set at 280° C. and the testing load, at 2,160 g. Larger values show better flowability.

[II] Rigidity

Dried pellets of the composition were molded into a flexural test specimen (127 mm × 12.7 mm × 6.35 mm). The test specimen was treated at a temperature of 23° C. and a humidity of 50% for 24 hours, and then its flexural strength was measured at 23° C. by a tensile tester (Model TOM 500D, made by Shinko Co., Ltd.). From its stress-strain curve, the flexural modulus of the specimen was determined. Higher flexural moduli indicate higher rigidity.

[III] Solvent resistance

[III-a] Flexural test in a solvent

A flexural test specimen (127 mm × 12.7 mm × 6.35 mm) was molded from dried pellets by using an injection molding machine. The specimen was treated at a temperature of 23° C. and a humidity of 50% for 24 hours. It was then dipped in high-octane gasoline (a product of Showa Oil Co., Ltd.) or carbon tetrachloride (first class reagent grade) for 15 seconds, and in this state its flexural strength was measured by a tensile tester (Model TOM 500D, made by Shinko Co., Ltd.). The solvent resistance was evaluated by the ratio of the flexural strength (a) to the flexural strength (920 kgf/cm$^2$) of a sample of the same size made from Panlite L-1250 (a tradename for a bisphenol A-type polycarbonate, manufactured by Teijin Chemicals Ltd.) in the air [(a)/920]×100. Higher ratios show better solvent resistance.

[III-b] Bolt clamping test

A flat plate, 127 mm × 127 mm × 3 mm, was molded from pre-dried pellets by means of an injection molding machine. Holes with a diameter of 6 mm were bored in the plate by a drill, and the plate was treated at a temperature of 23° C. and a humidity of 50% for 24 hours. After the treatment, the plate was clamped with M6 bolts and nuts at a torque of 70 kgf.cm. The plate was dipped in a given solvent for 5 minutes, allowed to stand in the air for 24 hours, and then observed for the occurrence of cracks.

The absence of cracks shows excellent solvent resistance.

[IV] Impact strength

Impact test specimens having a size of 64 mm × 12.7 mm × 3.18 mm or a size of 64 mm × 12.7 mm × 6.35 mm were molded from dried pellets of the composition by using an injection molding machine, and a notch of 0.25 mmR was provided in the specimens. Each specimen was treated at a temperature of 23° C. and a humidity of 50% for 24 hours, and then its impact strength was measured by an Izod impact tester (made by Toyo Seiki Co., Ltd.). Higher impact strength values show higher impact strength.

[IV-a] Impact strength at low temperatures

A notched impact test specimen molded as above was allowed to stand in a constant temperature vessel kept at −10° C. for 1 hour, and immediately after it was taken out from the vessel, it was tested for impact strength by the same Izod impact tester as described above. Higher impact strength values show higher impact strength.

[IV-b] Test for resistance to the deterioration of impact strength by heat aging The notched test sample prepared in (IV-a) above was left to stand in a constant temperature vessel at 125° C. for 65 hours. Then, it was taken out of the vessel, and treated at a temperature of 23° C. and a humidity of 50% for 24 hours. After the above heat aging treatment, the impact strength of the sample was measured by the aforesaid Izod impact tester. Higher impact strength (kgf.cm/cm) shows higher resistance to the deterioration of impact strength by heat aging.

[IV] Mold releasing test

Pre-dried pellets were continuously molded into cup-like articles having a wall thickness of 4 mm, a height of 20 mm and a bottom diameter of 63 mm at a cylinder temperature of 270° C. and a mold temperature of 80° C. The releasing mold load of a molded article obtained in the 30th shot was measured by a strain gauge fixed to the ejector plate of the mold. Lower mold releasing loads (kg) show better mold releasability.

EXAMPLES 1 TO 6 AND COMPARATIVE EXAMPLES 1 TO 10

In each run, pre-dried polycarbonate resin (Panlite L-1250, a trademark for a bisphenol A-type polycarbonate manufactured by Teijin Chemicals, Ltd.) (component A), each of the aromatic polyester resins (component B) shown in Table 1 below, isobutylene copolymer rubber (IIR-065, a trademark for a product of Nippon Butyl Co., Ltd.) (component C), and an elastomeric acrylic graft copolymer (HIA-15, a trademark for a product of Kureha Chemical Industry Co., Ltd.) (component D) were mixed in the amounts indicated in Table 1 by means of a V-type blender to form a polycarbonate resin composition. The composition was then melt-extruded at 280° C. by using an extruder having a screw diameter of 30 mm (Model VSK-30 made by Chuo Kikai Co., Ltd.).

Test specimens were prepared by injection molding of the resulting composition in pellet form as described above in regard to test specimen preparation, and tested for melt flow rate, flexural modulus, solvent resistance, impact strength, impact strength at low temperatures, and resistance to the deterioration of impact strength by heat aging. The results are shown in Table 1.

EXAMPLES 7 TO 14 AND COMPARATIVE EXAMPLES 11 TO 14

Example 1 was repeated except that each of the olefin resins (component E) shown in Table 2 were used in addition to the resin (A), the resin (B), the rubber (C) and the copolymer (D) used in Example 1.

The results are shown in Table 2.

In Tables 1 and 2 below, the following abbreviations are used.

PET(a): polyethylene terephthalate (tradename TR-2000, manufactured by Teijin Limited)
PET(b): polyethylene terephthalate (tradename TR-R, manufactured by Teijin Limited)
PBT: polybutylene terephthalate (tradename CH-7000, manufactured by Teijin Limited)
MIBK: methylisobutyl ketone
PMP: polymethylpentene (tradename RT-18, manufactured by Mitsui Petrochemical Industries, Ltd.)
PE: polyethylene (tradename Hizex 3300F, manufactured by Mitsui Petrochemical Industries, Ltd.)
PP: polypropylene (tradename XK-154, manufactured by Chisso Petrochemical Co., Ltd.)
O: no cracking occurred (Cracking in the belt clamping test)
X: cracking occurred (Cracking in the bolt clamping test).

TABLE 1

| | | Composition (parts) | | | | Melt flow rate (g/10 min.) | Flexural modulus ($\times 10^3$ Kgf/ $cm^2$) | Solvent resistance | | | | |
|---|---|---|---|---|---|---|---|---|---|---|---|---|
| | | | | | | | | Relative flexural strength in the solvent (%) | | Cracking in the bolt clamping test | | |
| | | (B) | | | | | | High-octane gasoline | $CCl_4$ | High-octane gasoline | $CCl_4$ | MIBK |
| Run | (A) | Type | Amount | (C) | (D) | | | | | | | |
| Example | | | | | | | | | | | | |
| 1 | 65 | PET(a) | 20 | 5 | 10 | 11.8 | 20.0 | 77 | 73 | O | O | O |
| 2 | 60 | PET(b) | 25 | 5 | 10 | 10.1 | 18.8 | 72 | 75 | O | O | O |
| 3 | 58 | " | 30 | 5 | 7 | 10.5 | 18.6 | 68 | 70 | O | O | O |
| 4 | 71 | PBT | 15 | 7 | 7 | 11.9 | 20.2 | 76 | 80 | O | O | O |
| 5 | 55 | " | 23 | 12 | 10 | 12.3 | 18.8 | 73 | 72 | O | O | O |
| 6 | 50 | " | 40 | 5 | 5 | 13.9 | 21.4 | 77 | 86 | O | O | O |
| Comparative Example | | | | | | | | | | | | |
| 1 | 100 | — | — | 0 | 0 | 8.5 | 22.3 | 50 | 9 | X | X | X |
| 2 | 8 | PBT | 70 | 8 | 14 | 12.0 | 16.7 | 63 | 64 | O | O | O |
| 3 | 80 | PET(a) | 3 | 7 | 10 | 13.6 | 17.2 | 64 | 57 | O | O | X |
| 4 | 80 | PBT | 15 | 0 | 5 | 9.5 | 22.4 | 56 | 14 | X | X | X |
| 5 | 60 | " | " | 20 | " | 24.6 | 15.7 | 60 | 62 | O | O | O |
| 6 | 70 | PET(a) | 25 | 5 | 0 | 12.9 | 21.1 | 78 | 86 | X | O | O |
| 7 | 40 | PET(b) | " | " | 30 | 0.4 | 14.0 | 53 | 47 | O | O | O |
| 8 | 50 | " | 15 | 15 | 20 | 8.4 | 13.7 | 51 | 51 | O | O | O |
| 9 | 70 | PBT | 26 | 2 | 2 | 12.3 | 22.3 | 71 | 88 | X | O | O |
| 10 | 10 | " | 85 | " | 3 | 6.6 | 22.8 | 73 | 82 | O | O | O |

| Izod impact strength (kgf · cm/cm) | | | |
|---|---|---|---|
| | Heat-aging at 125° C. for 65 hours | | Mold releasing |
| ⅛" thick | ¼" thick | | |

TABLE 1-continued

| Run | at −10° C. ⅛" thick | at −10° C. ¼" thick | Before treatment | After treatment | Before treatment | After treatment | load (kg) |
|---|---|---|---|---|---|---|---|
| Example | | | | | | | |
| 1 | 33 | 28 | 81 | 50 | 55 | 49 | 70 |
| 2 | 31 | 25 | 79 | 69 | 60 | 53 | 75 |
| 3 | 29 | 22 | 71 | 50 | 57 | 46 | 90 |
| 4 | 77 | 36 | 85 | 70 | 73 | 60 | 70 |
| 5 | 25 | 24 | 84 | 45 | 68 | 22 | 75 |
| 6 | 23 | 22 | 83 | 69 | 63 | 54 | 100 |
| Comparative Example | | | | | | | |
| 1 | 84 | 12 | 95 | 7 | 14 | 5 | >100 |
| 2 | 4 | 2 | 8 | 8 | 4 | 5 | — |
| 3 | 29 | 18 | 71 | 66 | 54 | 48 | >100 |
| 4 | 89 | 17 | 94 | 80 | 73 | 15 | >100 |
| 5 | 11 | 11 | 87 | 9 | 52 | 6 | >100 |
| 6 | 12 | 12 | 26 | 11 | 84 | 13 | — |
| 7 | 20 | 11 | 62 | 49 | 28 | 17 | — |
| 8 | 11 | 12 | 66 | 57 | 46 | 35 | >100 |
| 9 | 20 | 11 | 93 | 67 | 77 | 17 | — |
| 10 | 4 | 4 | 6 | 5 | 5 | 4 | — |

TABLE 2

| | | Composition (parts) | | | | | | Melt flow rate (g/10 min.) | Flexural modulus (× 10³ kgf/cm²) | Solvent resistance Flexural strength in the solvent (%) | | Cracking in the bolt clamping test | | |
|---|---|---|---|---|---|---|---|---|---|---|---|---|---|---|
| | | (B) | | | | (E) | | | | High-octane gasoline | CCl₄ | High-octane gasoline | CCl₄ | MIBK |
| Run | (A) | Type | Amount | (C) | (D) | Type | Amount | | | | | | | |
| Example | | | | | | | | | | | | | | |
| 7 | 74 | PBT | 15 | 3 | 5 | PMP | 3 | 10.5 | 20.6 | 72 | 80 | O | O | O |
| 8 | 60 | " | 25 | 5 | " | " | 5 | 14.2 | 21.2 | 73 | 86 | O | O | O |
| 9 | 56 | " | 35 | 2 | " | " | 2 | 13.1 | 19.9 | 79 | 83 | O | O | O |
| 10 | 66 | " | 20 | 5 | " | PE | 4 | 11.0 | 19.9 | 71 | 73 | O | O | O |
| 11 | 57 | " | 30 | 3 | 7 | " | 3 | 10.2 | 18.6 | 71 | 73 | O | O | O |
| 12 | 60 | PET$^{(a)}$ | 25 | 5 | 5 | PMP | 5 | 12.2 | 19.5 | 76 | 79 | O | O | O |
| 13 | 62 | " | 20 | 5 | 8 | PE | 5 | 10.1 | 18.6 | 68 | 70 | O | O | O |
| 14 | 67 | PBT | 20 | 5 | 5 | PP | 3 | 10.6 | 20.2 | 70 | 72 | O | O | O |
| Comparative Example | | | | | | | | | | | | | | |
| 11 | 52 | PBT | 20 | 3 | 5 | PMP | 20 | 11.6 | 16.1 | 73 | 68 | O | O | O |
| 12 | 57 | PET$^{(b)}$ | 15 | 3 | 5 | PE | 20 | 8.3 | 15.5 | 59 | 59 | O | O | O |
| 13 | 50 | PBT | 20 | 10 | 10 | " | 10 | 12.8 | 17.9 | 70 | 69 | O | O | O |
| 14 | " | PET | 44 | 2 | 2 | PMP | 2 | 15.0 | 21.8 | 78 | 88 | O | O | O |

| | Izod impact strength (kgf · cm/cm) | | Heat aging at 125° C. for 65 hours | | | | Mold releasing load (kg) |
|---|---|---|---|---|---|---|---|
| | at −10° C. | | ⅛" thick | | ¼" thick | | |
| Run | ⅛" thick | ¼" thick | Before treatment | After treatment | Before treatment | After treatment | |
| Example | | | | | | | |
| 7 | 76 | 55 | 86 | 70 | 71 | 64 | 45 |
| 8 | 32 | 24 | 70 | 66 | 61 | 52 | 55 |
| 9 | 23 | 25 | 67 | 47 | 66 | 58 | 70 |
| 10 | 77 | 36 | 85 | 74 | 71 | 59 | 50 |
| 11 | 31 | 24 | 89 | 62 | 62 | 57 | 60 |
| 12 | 32 | 24 | 68 | 59 | 61 | 47 | 50 |
| 13 | 25 | 27 | 75 | 60 | 64 | 57 | 45 |
| 14 | 28 | 23 | 81 | 65 | 69 | 56 | 60 |
| Comparative Example | | | | | | | |
| 11 | 17 | 16 | 37 | 25 | 31 | 27 | 40 |
| 12 | 15 | 16 | 90 | 35 | 63 | 10 | 35 |
| 13 | 22 | 13 | 79 | 36 | 53 | 25 | 35 |
| 14 | 12 | 12 | 82 | 13 | 51 | 15 | — |

What is claimed is:

1. A polycarbonate resin composition comprising
(A) 20 to 90% by weight of a polycarbonate resin,
(B) 5 to 70% by weight of an aromatic polyester resin,
(C) 1 to 15% by weight of an isobutylene copolymer rubber composed of a major proportion of isobutylene and a minor proportion of isoprene,
(D) 1 to 20% by weight of an elastomeric acrylic graft copolymer resin composed of, as a trunk polymer, a crosslinked acrylic copolymer containing not less than 3% by weight of butadiene as a comonomer and being free from ethylene and grafted thereto, at least one grafting monomer selected from the group consisting of styrene, alkyl acrylates and alkyl methacrylates, and (E) 0 to 15% by weight of an olefin resin derived from an olefin having 2 to 6 carbon atoms; wherein the weight ratio of [resin (A)+resin (B)]/[rubber (C)+resin (D)] is from 2 to 20, and when the resin (E) is present, the weight ratio of resin (B)/[rubber (C)+resin (D)+resin (E)] is from 1 to 5.

2. The composition of claim 1 wherein the polycarbonate resin (A) is a polycarbonate derived from a dihydric phenol component consisting mainly of 2,2-bis(4-hydroxyphenyl)propane.

3. The composition of claim 1 wherein the aromatic polyester resin is a polyester derived from an alkylene glycol with 2 to 10 carbon atoms and an aromatic dicarboxylic acid with 8 to 12 carbon atoms or an ester-forming derivative thereof.

4. The composition of claim 1 wherein the trunk polymer of the acrylic copolymer (D) is a polymer having an average particle diameter of 0.13 to 0.20 micron and derived from 35 to 60 parts by weight of an alkyl acrylate having 2 to 12 carbon atoms in the alkyl group, 5 to 20 parts by weight of butadiene, an alkyl methacrylate having 1 to 4 carbon atoms in the alkyl group and 0.6 to 1.3 parts by weight of a crosslinking agent, and the grafting monomer is a mixture of styrene and methyl methacrylate.

5. The composition of claim 1 wherein the isobutylene copolymer rubber (C) is a copolymer rubber composed of 93 to 99% by weight of isobutylene and 7 to 1% by weight of isoprene.

6. The composition of claim 1 wherein the resin (E) is present in an amount of from 1 to 10% by weight.

7. The composition of claim 6 wherein the olefin resin (E) is polyethylene, polypropylene or poly(4-methylpentene-1).

8. The composition of claim 1 comprising:
(A) 40 to 80% by weight of said polycarbonate resin;
(B) 10 to 45% by weight of said aromatic polyester resin;
(C) 2 to 12% by weight of said isobutylene copolymer rubber;
(D) 3 to 15% by weight of said elastomeric acrylic graft copolymer resin; and
(E) 0 to 10% by weight of said olefin resin.

9. The composition of claim 8 wherein the olefin resin (E) is present in an amount of from 1 to 10% by weight.

10. The composition of claim 1 wherein said composition has a melt flow rate of about 10 to 15 g/10 min, a flexural modulus of about $18 \times 10^3$ to $22 \times 10^3$ kgf/cm$^2$, a relative flexural strength in high-octane gasoline of about 65 to 80, a relative flexural strength in carbon tetrachloride of about 70 to 90, absence of cracking in a bolt clamping test in high-octane gasoline, carbon tetrachloride or methylisobutyl ketone, a releasability of not more than about 100 kg in a mold releasability test, an Izod impact strength of at least about 23 kgf.cm/cm for a sample having a thickness of 3.18 mm in an impact resistance test at $-10°$ C. and a heat aging resistance of at least about 45 kgf.cm/cm in an impact heat aging test at 125° C. for 65 hours for a sample having a thickness of 3.18 mm.

11. The composition of claim 1 in which the proportion of the olefin resin (E) is 0.

12. The composition of claim 8 in which the proportion of the olefin resin (E) is 0.

* * * * *